3,403,129
PARAFORMALDEHYDE STABILIZED WITH ELEMENTAL TITANIUM AND DERIVATIVES THEREOF
Valentin Alexeevich Kargin, Vladimir Nickolaevich Kotrelev, Modest Sergeevich Akutin, and Alexandr Filippovich Opolovenkov, Moscow, and Boris Vladimirovich Andrianov, Mytishchi, and Mikhail Vladimirovich Kotrelev, Moscow, U.S.S.R., assignors to Gosudarstvenny Nauchno - Issledovatelsky Institute Plasticheskikh Mass., Moscow, U.S.S.R.
No Drawing. Filed Oct. 22, 1964, Ser. No. 405,839
1 Claim. (Cl. 260—45.75)

This invention relates to a method of stabilizing polyformaldehyde.

Polyformaldehyde is not stable at elevated temperatures. Stabilizers are compounded with it to confer the necessary thermal stability.

The methods of stabilizing polyformaldehyde known at the present time consist in blocking the end groups of the polymer and introducing into the finished polyformaldehyde at least two stabilizers: an antioxidant (for example diphenylamine, polysulfides, etc.), and an acceptor —a polyamide resin or other substances.

However, the known methods cannot provide polyformaldehyde having simultaneously unvarying mechanical properties and stability at elevated temperatures. Besides this, the necessity of introducing several stabilizers complicates the technology of preparing polyformaldehyde.

It is an object of the present invention to develop a method of stabilizing polyformaldehyde resins, which provides for the preservation of the molecular weight and the macrostructure of polyformaldehyde at elevated temperatures and the improvement of its thermal stability and mechanical strength.

Another object of the invention is to provide a stabilizer equal in its effectiveness to two or more of the stabilizers now used together.

Still another object of the present invention is the sharp improvement of the physical-mechanical properties of polyformaldehyde, especially the impact strength.

Other objects and advantages of the invention will be explained in the following description and examples.

The new method of stabilizing polyformaldehyde consists in introducing organic and inorganic compounds of titanium which do not react with polyformaldehyde, including finely divided titanium. Such compounds used as stabilizers are titanium dioxide, titanium hydride, triethanolamine titanate and others which may be used either separately or in various combinations.

These additives may be introduced into polyformaldehyde in any stage of its preparation or in the final product, for example, in the formaldehyde polymerization stage or after polymerization in the end-group blocking stage.

The introduction of titanium compounds enables one to change the macrostructure of polyformaldehyde in a predetermined way, considerably improving its mechanical properties and thermal stability.

In accordance with the preferred method of realizing the invention, the stabilization of polyformaldehyde is effected by introducing into the polymer 0.1–2.0% (by the polymer weight) of the above mentioned titanium compounds. During the introduction it is necessary to mix the polyformaldehyde thoroughly with the stabilizer in some suitable mixer.

Example 1.—Introduction of stabilizer during the polymerization process

Into the appartus used in the preparation of polyformaldehyde there is fed formaldehyde and other reactants in such quantities that there are obtained 99 parts by weight of polyformaldehyde, and during polymerization there is introduced 1 part by weight of titanium dioxide.

After the conclusion of polymerization the end groups of the polymer obtained are blocked by any of the known methods, and the polyformaldehyde is then washed, dried and granulated. This polyformaldehyde has the following properties:

Induction period at 222° C. _____minutes__  23
Impact strength _____kg. cm./cm.$^2$__  45
Relative viscosity _____  0.9
Thermostability according to Vicat _____° C__  172

Polyformaldehyde produced in the usual way also has a relative viscosity of 0.9; it has an induction period of 12 minutes, but it cannot be processed in a moulding press in the usual way or in an extruder.

Example 2.—Introduction of titanium hydride into the finished polyformaldehyde

Into a ball mill with a small number of balls there are charged 99 parts by weight of polyformaldehyde and 1 part by weight of titanium hydride ($TiH_{1.65}$) and mixed for a period of 6 hours; the polymer is then granulated in an extruder. During the latter process, the temperature of the entire extruder heating zone is maintained at a temperature by 10–15° C. lower than that usual for the optimum conditions. The temperature of the extruder head, in our proposed process should be maintained in the range 175–180° C.

From the extruder screw, polyformaldehyde emerges in the form of a black ribbon which has an induction period of 25 minutes. Polyformaldehyde which does not contain a stabilizer has an induction period of 14 minutes. Polyformaldehyde stabilized with titanium hydride has the following properties:

Kg./cm.$^2$
Bending strength _____ 1200
Longitudinal strength _____  720

To produce articles from the polyformaldehyde stabilized with titanium hydride, the latter is processed in a moulding press at 15° C. lower than is being conventionally practised.

Example 3.—Introduction of titanium dioxide into the finished polyformaldehyde product In a ball mill, provided with a small number of balls, 99.5 parts by weight of polyformaldehyde and 0.5 part by weight of titanium oxide are thoroughly mixed. The product is then granulated in an extruder following the usual processing schedule employed for polyformaldehyde. The polyformaldehyde is obtained in the form of the white granules, with a period of induction which allows the polymer to be processed in the moulding press without difficulty. Articles produced in the moulding press are of white color with a glossy surface and have the following properties:

Impact strength _____kg. cm./cm.$^2$__   65
Bending strength _____kg./cm.$^2$__ 1050
Longitudinal strength _____kg./cm.$^2$__  700
Thermal stability according to Vicat _____° C__  174

The wear resistance of polyformaldehyde stabilized with titanium dioxide is twice as great as that of polymer stabilized with diphenylamine and polyamide resin.

Example 4.—Introduction of triethanolamine titanate into the finished polymer

Into 99 parts by weight of polyformaldehyde, there is introduced 1 part by weight of triethanolamine titanate in the form of 1% solution in alcohol. The mixture is thoroughly mixed, dried and granulated. The moulded product, obtained under usual processing conditions has a yellow glossy appearance with the following properties:

Period of induction _____ min__ 27
Impact strength _____ kg. cm./cm.$^2$__ 130
Thermal stability according to Vicat _____° C__ 168

Example 5.—Introduction of finely divided titanium into the finished polyformaldehyde There are mixed 1 part by weight of powdered metallic titanium with a dispersity equal to that of titanium dioxide and 99 parts by weight of polyformaldehyde. The mixing is carried out in a ball mill; further processing to form granules is carried out under ordinary conditions in an extruder. Specimens formed in a moulding press have the following properties:

Impact strength _____ kg. cm./cm.$^2$__ 55
Longitudinal strength _____ kg./cm.$^2$__ 740

Although a preferred embodiment of the invention has been disclosed in this description, it should be understood that various changes and modifications can readily occur to those skilled in the art without departing from the spirit of the invention and the scope of the appended claim.

What we claim is:

1. A stabilized polymer compound consisting essentially of polyformaldehyde and 0.1 to 2% by weight of a stabilizer which is non-reactive with the polyformaldehyde and is selected from the group consisting of titanium dioxide, titanium hydride, and triethanolamine titanate.

References Cited

UNITED STATES PATENTS

| 2,933,465 | 4/1960 | Olson _____ 260—45.75 |
| 2,989,508 | 6/1961 | Hudgin et al. _____ 260—45.9 |
| 3,007,897 | 11/1961 | Behrends et al. _____ 260—45.9 |

FOREIGN PATENTS 831,925    4/1960    Great Britain.

DONALD E. CZAJA, *Primary Examiner.*

V. P. HOKE, *Assistant Examiner.*